US008887140B2

(12) United States Patent
Lerouge et al.

(10) Patent No.: US 8,887,140 B2
(45) Date of Patent: Nov. 11, 2014

(54) SYSTEM AND METHOD FOR ANNOTATION-DRIVEN FUNCTION INLINING

(75) Inventors: Julien Lerouge, Santa Clara, CA (US); Nicholas T. Sullivan, Sunnyvale, CA (US); Gideon M. Myles, San Jose, CA (US); Jon McLachlan, San Francisco, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1061 days.

(21) Appl. No.: 12/688,807

(22) Filed: Jan. 15, 2010

(65) Prior Publication Data
US 2011/0179403 A1 Jul. 21, 2011

(51) Int. Cl.
*G06F 21/14* (2013.01)
*G06F 9/45* (2006.01)
*G06F 9/46* (2006.01)
*G06F 17/24* (2006.01)

(52) U.S. Cl.
CPC .............. *G06F 21/14* (2013.01); *G06F 8/4443* (2013.01); *G06F 9/463* (2013.01); *G06F 17/241* (2013.01)
USPC ........................................................ 717/141

(58) Field of Classification Search
CPC ..... G06F 8/4443; G06F 17/241; G06F 21/04; G06F 9/4361
USPC ........................................................ 717/141
See application file for complete search history.

(56) References Cited

U.S. PATENT DOCUMENTS

| 5,740,443 | A | 4/1998 | Carini |
| 6,668,325 | B1 | 12/2003 | Collberg et al. |
| 7,340,732 | B2 | 3/2008 | Gu |
| 2005/0097527 | A1* | 5/2005 | Chakrabarti et al. ......... 717/140 |
| 2005/0097528 | A1 | 5/2005 | Chakrabarti et al. |
| 2005/0097533 | A1* | 5/2005 | Chakrabarti et al. ......... 717/144 |
| 2006/0294502 | A1* | 12/2006 | Das et al. ...................... 717/129 |
| 2009/0193400 | A1 | 7/2009 | Baev et al. |
| 2009/0254893 | A1* | 10/2009 | Ahuja et al. .................. 717/152 |
| 2012/0254830 | A1* | 10/2012 | Conrad et al. ................ 717/106 |

OTHER PUBLICATIONS

Matthew Arnold and David Grove, "Collecting and Exploiting High-Accuracy Call Graph Profiles in Virtual Machines," IBM; T.J. Watson Research Center, Mar. 2005 (Available online at http://domino.watson.ibm.com/comm/research_people.nsf/pages/dgrove.cgo05.html/$FILE/cgo05.pdf, last visited Jan. 15, 2010).
Xuejun Yang, Nathan Cooprider and John Regehr, "Eliminating the Call Stack to Save RAM," Proceedings of the 2009 ACM SIGPLAN/SIGBED conference on Languages, compilers, and tools for embedded systems, Dublin, Ireland, Jun. 2009, pp. 1-10.

* cited by examiner

*Primary Examiner* — Jonathan C Teixeira Moffat
*Assistant Examiner* — Lynda Dinh
(74) *Attorney, Agent, or Firm* — Novak Druce Connolly Bove + Quigg LLP (57) ABSTRACT

Disclosed herein are systems, methods, and computer-readable storage media for obfuscating using inlined functions. A system configured to practice the method receives a program listing including annotated functions for obfuscation, identifies an annotated function called more than once in the program listing, and creates an inline control flow structure in the program listing for the identified annotated function, the control flow structure being computationally equivalent to inlining the identified annotated function into the program listing for each occurrence of the identified annotated function. The program listing can include tiers of annotated functions. The system can identify annotated functions called more than once based on an optionally generated callgraph. The system can create inline control flow structures in the program listing in order of annotation importance. The system can identify how many times each annotated function is called in the program listing.

24 Claims, 5 Drawing Sheets

SYSTEM AND METHOD FOR ANNOTATION-DRIVEN FUNCTION INLINING

BACKGROUND

1. Technical Field

The present disclosure relates to software obfuscation and more specifically to minimizing overhead associated with inlined function calls.

2. Introduction

Software publishers often attempt to restrict access to portions of compiled software executables to thwart would-be reverse engineering while still allowing the executables to function properly. Reverse engineering is the practice of dissecting and/or analyzing software to understand how it works. On certain systems, reverse engineering can retrieve information stored within software such as information related to cryptographic keys or copy protection schemes. Reverse engineers can even tamper with the software itself or call specific portions of the software for unauthorized purposes.

One approach to thwart reverse engineering and other attacks is to reduce the number of entry points into a program or dynamically linked library (DLL). This can be accomplished by inlining tasks that were previously separate functions. However, for large and/or commonly used functions, this approach quickly leads to code bloat. The resulting bloated code can exceed stack and function size limits. Further, such code can be difficult to maintain because a single change to one inlined segment must be propagated through all the remaining inlined segments in the code. Further, an attacker can compare portions of the code which are the same (i.e. inlined) for clues as to the code's purpose and how it is used.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for obfuscating a program listing using inlined functions. A system configured to practice the method receives a program listing including annotated functions for obfuscation, builds a callgraph based on the annotated functions, identifies an annotated function called more than once in the program listing, and creates an inline control flow structure in the program listing for the identified annotated function, the control flow structure being computationally equivalent to inlining the identified annotated function into the program listing for each occurrence of the identified annotated function. Also disclosed herein are non-transitory computer-readable storage media storing computer programs embedded with obfuscated inlined functions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The disclosure first sets forth some exemplary computing device components. Next the disclosure turns to the exemplary method embodiment, followed by discussion of a basic compiler. The disclosure then turns to an illustrative example of a main( ) function which calls functions bar( ) and baz( ) and demonstrates how to inline these functions in main( ).

Figure 1:
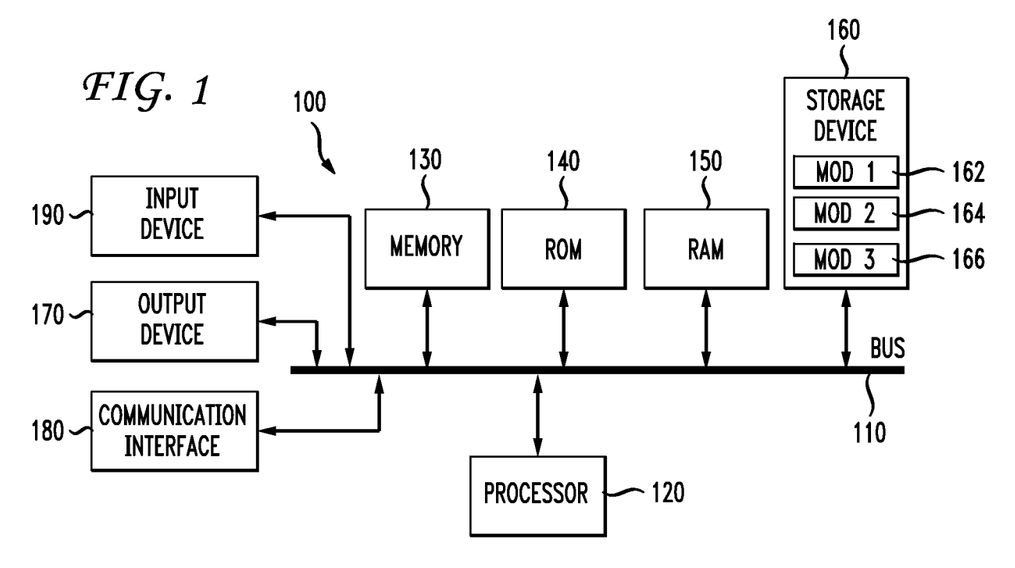
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, controlling the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules controlling the processor 120 to perform particular functions according to the programming of the module. For example, FIG. 1 illustrates three modules Mod1 162, Mod2 164 and Mod3 166 which are modules controlling the processor 120. These modules may be stored on the storage device 160 and loaded into RAM 150 or memory 130 at runtime or may be stored as would be known in the art in other computer-readable memory locations.

Having disclosed some basic system components, the disclosure now turns to a discussion of the high level concept of obfuscating using inlining. Inlining is an approach for modifying computer program code. Program code typically includes functions and calls to functions. These functions typically compartmentalize certain procedures. When a computer running an application encounters a function call, the computer must push certain variables on the stack, perform the function call, and obtain the return values. These operations require a certain amount of time. The processing overhead cost of running the function call is eliminated if the function code is inlined, or effectively copied and pasted, in place of making the function call. However, inlined functions can quickly expand the program size and become difficult to maintain.

The approach outlined herein does not have these drawbacks. A programmer annotates certain functions for use with the inlining. If an annotated function is called twice, instead of inlining the annotated function code twice, the system inlines it once and generates a control flow structure, such as a series of jumps or GOTO statements, to reuse the first inlined code. This approach can be used for obfuscation and/or performance reasons. This approach obfuscates the code by merging the functional boundaries in the code, thereby reducing the entry points into the code and confusing an attacker. The system can perform this approach as part of the compiling process, during execution, and/or as part of an obfuscation tool that takes human-readable code as input and outputs obfuscated human-readable code. Obfuscated code performs equivalent computational operations as its source unobfuscated code, albeit with different execution paths, code size, and/or performance characteristics.

Figure 2:
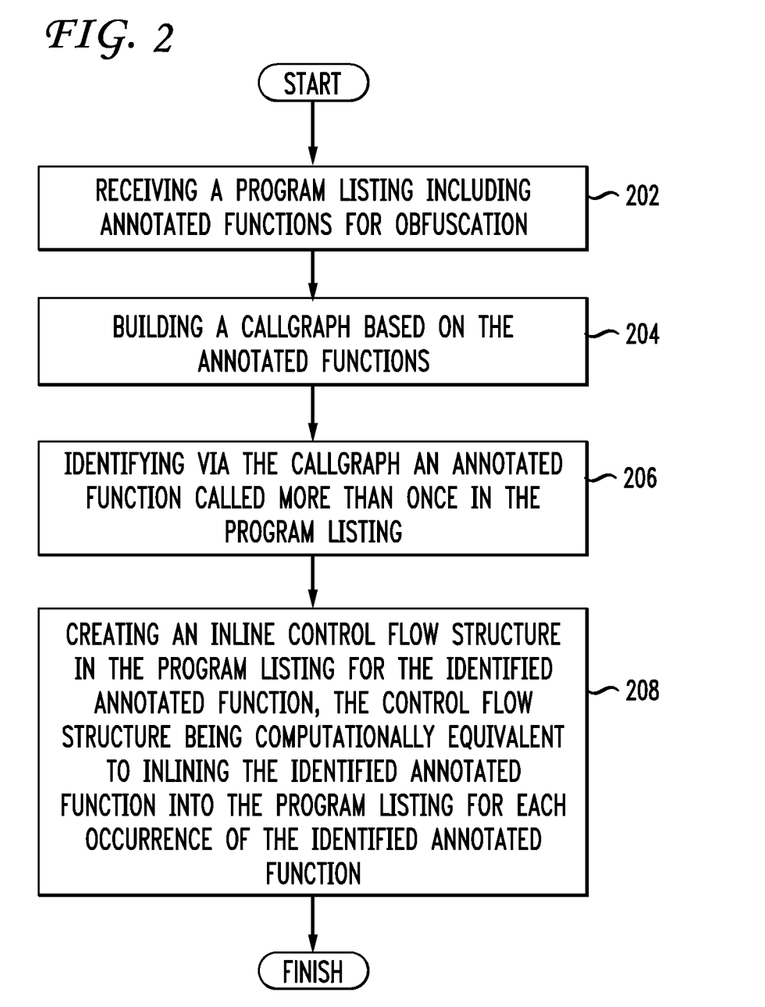
FIG. 2 illustrates an example method embodiment.

Having disclosed some basic system components and concepts, the disclosure now turns to the exemplary method embodiment shown in FIG. 2. For the sake of clarity, the method is discussed in terms of an exemplary system such as is shown in FIG. 1 configured to practice the method. FIG. 2 illustrates an example method embodiment for annotation-driven callgraph aware inlining. A suitably configured system 100 can perform any and/or all the steps of the method. First, the system 100 receives a program listing including annotated functions for obfuscation (202). A programmer manually enters the annotations in one aspect. In another aspect, an automated tool randomly or semi-randomly annotates certain functions. Such a tool can be incorporated as part of an obfuscating compiler. For example, the tool can analyze the code and annotate certain functions called more than once or annotate certain functions that contain a particular type of process or data that is called more than once. One example non-annotated function declaration is void multiply (int x, int y). The same example annotated function declaration is void _attribute_ ((annotation_title)) multiply (int x, int y). The annotations can share a single designated name or can include multiple levels or tiers of importance or priority. Additionally, the annotations can embody or include metadata describing additional operations to a compiler, for example. The compiler can preserve all or part of the metadata in the compiled code. While these example annotations are included as function attributes and used when declaring a function, the programmer can also include annotations when the function is called. The difference is that an annotation when the function is declared results in inline obfuscating every call to the annotated function, but annotations when the function is called can result in inline obfuscating only a subset of the function calls.

Figure 7:
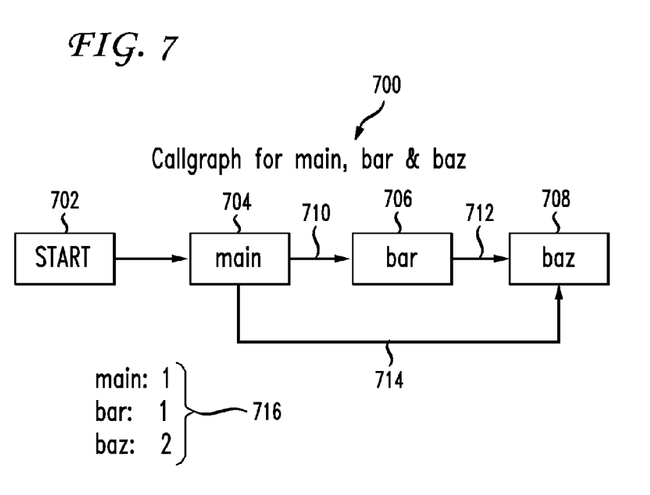
FIG. 7 illustrates an exemplary callgraph representing the relationship of the main function, bar( ) and baz( ).

Next the system 100 optionally builds a callgraph based on the annotated functions (204). The callgraph represents how many times each function is reached and can include other data (an example callgraph is illustrated in FIG. 7 and discussed below). The system 100 identifies via the callgraph an annotated function called more than once in the program listing (206). If the system 100 does not generate the optional callgraph, the system 100 can identify annotated functions called more than once using other approaches. The system 100 can identify which functions are called more than once based on the callgraph, or the callgraph can track exactly how many times each function is called. The callgraph can track only annotated functions or both annotated and unannotated functions. The callgraph typically includes a start state.

The system 100 creates an inline control flow structure in the program listing for the identified annotated function, the control flow structure being computationally and/or functionally equivalent to inlining the identified annotated function into the program listing for each occurrence of the identified annotated function (208). The system can be a computer or other device executing a software compiler which generates intermediate and/or executable code based on the obfuscated inlined functions. The compiler can produce a computer-executable file stored for later execution.

In one aspect, a programmer includes different annotations which form tiers of annotated functions. The tiers can be associated with an importance or priority. The system can create inline call structures for the higher importance or higher priority annotations first. The system can also create inline control flow structures to meet a threshold, starting with the higher priority annotations and ending when the threshold is met. The threshold can be based on one or more of file size, compile time, run-time performance and desired complexity. For example, the run-time performance of the resulting obfuscated code may be set at a desired threshold such that only the higher priority functions are processed in this manner. Similarly, the complexity of reverse engineering the resulting obfuscated code may be set at a desired complexity. In this example, the system can divide one set of functions into different inlined structures. The tool can create additional complexity to confuse a reverse engineer by inlining one set of calls to function foo one way and another set of calls to function foo in a different way.

In one aspect, a non-transitory computer-readable storage medium stores instructions which, when executed by a computing device, cause the computing device to perform certain steps. The instructions can be embedded with obfuscated inlined functions generated by the steps outlined above.

The obfuscation principles described herein can be combined with one or more other obfuscation approaches in any sequence so as to provide additional layers of complexity to confuse attackers and increase the cost and/or time required to understand and extract information from compiled code.

Figure 3:
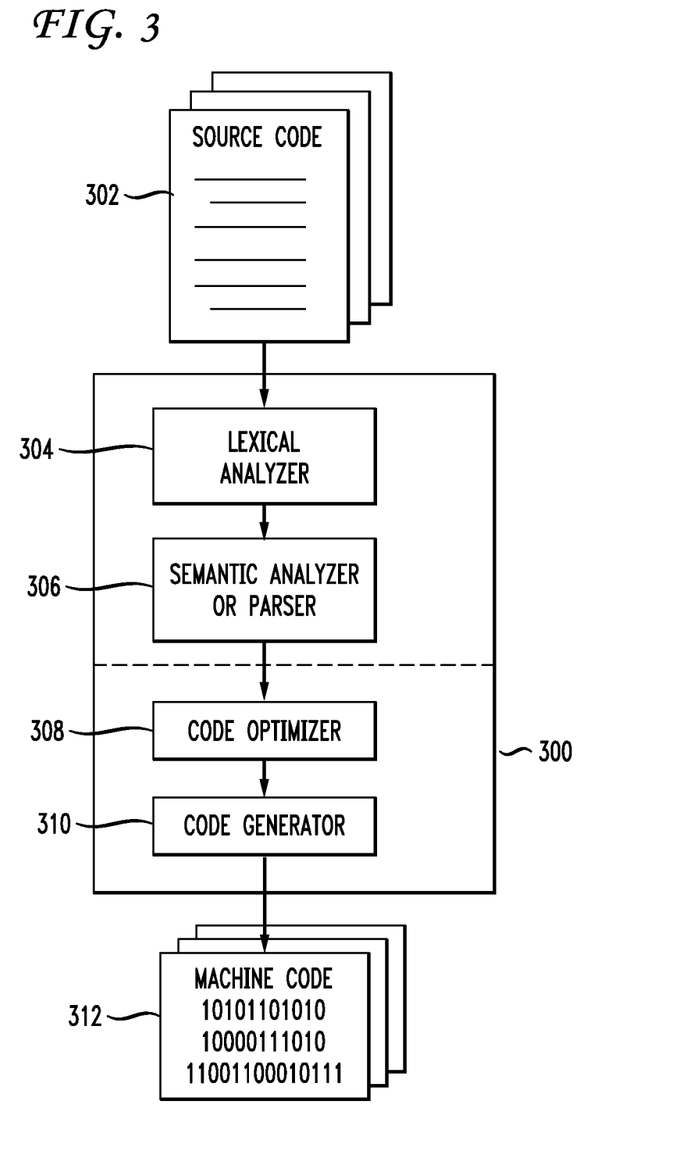
FIG. 3 illustrates a block diagram of an exemplary compiler.

Any or all of the steps of the method and/or modules in the system 100 can be integrated with, include, or interact with a compiler. FIG. 3 illustrates a block diagram of an exemplary compiler 300. The modules and elements of the exemplary compiler 300 can be modified and/or added to in order to implement the inlining obfuscation principles disclosed herein. A compiler 300 converts human-readable source code 302 to object code or machine code 312 which is understandable to and typically executable by a computing device 100. In one aspect, the source code 302 represents object code or machine code that has the obfuscation steps applied to generate modified object or machine code 312. A compiler 300 typically performs the following representative operations as well as other operations: lexical analysis 304, preprocessing, parsing 306, semantic analysis 306, code optimization 308, and code generation 310. Compilers allow programmers to write software using high level languages and convert those high level instructions to binary machine code 312.

The compiler 300 takes as input source code 302 for a computer program written in a programming language like Perl, C, Java, etc. Source code can also include other lower or higher level computer instructions as well as intermediate compiler outputs, for example. The compiler 300 passes the code to the front end of the compiler 300 which includes the lexical analyzer 304 and the semantic analyzer or parser 306. At this stage or at any other stage in the compiler 300, a module shown or not shown can perform all or part of the steps outlined above. The compiler 300 then operates on the source 302 in the back end, which includes the code optimizer 308 and the code generator 310. Often the division between the front end and the back end of a compiler is somewhat blurred. The compiler 300 can include other modules and can appear in different configurations. Other possible front end components include a preprocessing module and a semantic analysis module. The front end produces an intermediate representation of the code which is passed to the back end of the compiler 300. The back end of a compiler 300 can include an optimizer 308 and a code generator 310. Finally, the code generator 310 produces machine code 312 or object code. A linker, not shown, can combine the output 312 from several related compiled projects into a single executable file. An obfuscation tool separate from the compiler 300 can process the machine code 312 according to all or part of the steps outlined above to produce modified or obfuscated machine code. Likewise, an obfuscation tool can operate on source code 302 to produce modified or obfuscated source code which is passed to a regular, unmodified compiler 300. In one aspect, a module in the compiler, a pre-processing tool, and/or a post-processing tool operating together perform the overall task of obfuscation. Other compiler components and modules can be added within the spirit and scope of this disclosure.

Figure 4:
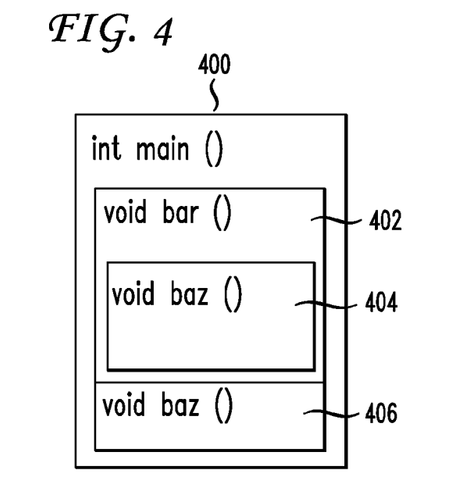
FIG. 4 illustrates an example main function calling functions bar( ) and baz( )

The disclosure now turns to a specific illustrative example of a main( ) function 400 which calls functions bar( ) and baz( ) and demonstrates how to inline these functions in main( ) 400. FIG. 4 illustrates a main function 400 which calls functions bar( ) 402 and baz( ) 406. The function bar( ) 402 contains a separate function call to baz( ) 404. The following pseudocode illustrates function main( ) function bar( ) 402 calls baz( ) 404, and function baz( ) 406. The pseudocode also illustrates one example of how functions can be annotated. This example shows how a programmer could annotate functions with an _attribute_ ((custom_inline)) flag. A programmer can include more than one annotation, and some annotations may not relate to inlining at all.

```
int main( ) {
    bar( );
    baz( );
}
int __attribute__ ((custom_inline)) bar( ) {
    baz( );
}
int __attribute__ ((custom_inline)) baz( ) {
    // baz code
}
```

Figure 5:
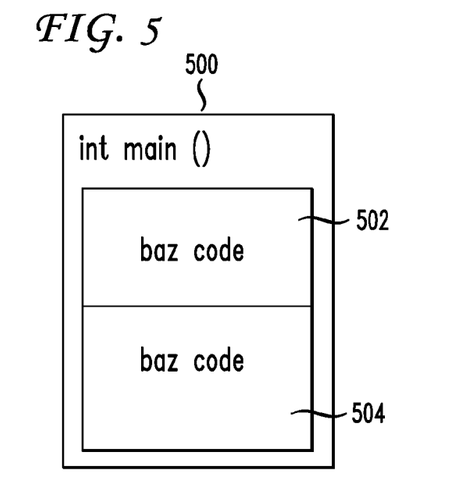
FIG. 5 illustrates an example main function with functions bar( ) and baz( ) inlined.

FIG. 5 illustrates an example main( ) function 500 with functions bar( ) 402 and baz( ) 406 (from FIG. 4) inlined using a traditional approach. A tool, such as a compiler or other pre- or post-processing tool, inlines the bar( ) 402 code first. Because bar( ) 402 includes a call to baz( ) 404, the tool inlines the baz code 502 corresponding to the baz( ) function call 404 in FIG. 4. The tool then inlines the baz code 504 corresponding to the baz( ) function call 406 in FIG. 4. The result is that the tool inlines the baz code two times 502, 504.

Figure 6:
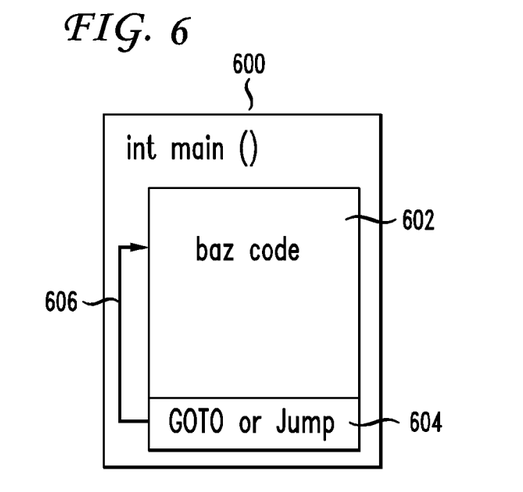
FIG. 6 illustrates an example main function with annotated functions bar( ) and baz( ) inlined.

FIG. 6 illustrates an example main( ) function 600 with annotated functions bar( ) 402 and baz( ) 406 inlined according to the principles disclosed herein. The tool recognizes that the baz code 602 would be duplicated if inlined using the traditional approach, as shown in FIG. 5. One way the tool can recognize which code would be duplicated is to use a callgraph as shown in FIG. 7, but the tool can use other approaches as well. In order to avoid the code bloat associated with the traditional approach, the tool creates a control flow structure which reduces the duplication and code bloat typically associated with inlining. In this example, the control flow structure is a GOTO statement or a JMP statement 604. The GOTO and JMP statements redirect 606 program execution to another location. The control flow structure allows for repeated use of the same inlined code.

FIG. 7 illustrates an exemplary callgraph 700 representing the relationship of the main function, bar( ) and baz( ). The callgraph includes a start state 702 and transitions between the states main 704, bar 706, and baz 708. The system 100 can perform a depth-first walk of the callgraph to keep track of how many times each function is reached and stopping on functions that the system 100 has already encountered. In this case, starting at the start state 702, the system 100 first encounters main 704 and increments the counter for main 704 by one. From main 704, the callgraph 700 follows transitions 710 to bar 706 and increments the counter 716 for bar 706 by one. From bar 706, the callgraph 700 follows transitions 712 to baz 708 and increments the counter 716 for baz by one. Then the callgraph 700 follows transitions 714 from main 704 to baz 708 and increments the counter 716 for baz by one again. At the end of the depth-first walk of the callgraph 700, the system 100 has a resulting table of counts 716 which shows that the system encountered main 704 and bar 706 one time each and that the system encountered baz 708 two times. The system 100 or tool can determine that baz code would be duplicated more than once because its count in the table is more than one. The use of the callgraph is optional. The system 100 can also process the code and count how many times each function is called or determine how many times each function is called using other approaches.

In another aspect, when the system 100 generates and/or analyzes a callgraph 700, the system 100 skips, merges, and/or does not include non-annotated functions. This behavior can speed up the depth-first walk of the callgraph because the system does not waste resources analyzing and counting functions which are not annotated for inlining and do not affect inlined functions.

In one aspect, the annotations include an indication of scope. The scope can be the entire program, so the system treats potential inline duplicates from the entire program in the same way. In another variation, the scope is a portion of the program, so potential inline duplicates are evaluated only based on the portion of the program within the scope. The system 100 can generate callgraphs 700 based on the indicated scope. The annotations can also include other metadata as part of the annotation title or as an optional flag to the annotation. The metadata can provide instructions regarding which type of control flow structure the system should use, for example.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the specific example embodiments and applications illustrated and described herein, and without departing from the spirit and scope of the disclosure.

We claim:

1. A computer-implemented method causing a computing device to perform steps comprising:
    identifying in a program listing an annotated function having a first call site and a second call site;
    inlining the annotated function at an inline location in the program listing; and
    replacing the first call site with a first inline control flow structure and the second call site with a second inline control flow structure, the first inline control flow structure and the second inline control flow structure redirecting execution flow to the inlined annotated function at the inline location, whereby a combination of the inlined annotated function at the inline location, the first inline control flow structure, and the second inline control flow structure is computationally equivalent to inlining the identified annotated function at the first call site and the second call site; wherein
    building a callgraph based on the annotated functions; and wherein
    identifying an annotated function two distinct call sites in the program listing is based on the callgraph.

2. The computer-implemented method of claim 1, wherein the program listing includes tiers of annotated functions.

3. The computer-implemented method of claim 2, the method further causing the computing device to create inline control flow structures in the program listing in an order based on the tiers of annotated functions.

4. The computer-implemented method of claim 2, the method further causing the computing device to create inline control flow structures in the program listing according to the tiers of annotated functions until the program listing meets a threshold.

5. The computer-implemented method of claim 1, the method further causing the computing device to create inline control flow structures in the program listing for annotated functions called a greatest number of times until the program listing meets a threshold.

6. The method of claim 1, wherein the inline location is a call site from the first call site or second call site.

7. The method of claim 1, wherein the first call site and second call site are identified based on a callgraph.

8. The method of claim 1, wherein the inline control flow structure includes a series of jump instructions or GOTO statements.

9. A system comprising:
    a processor;
    a module controlling the processor to identify in a program listing an annotated function having a first call site and a second call site;
    a module controlling the processor to inline the annotated function at the first call site; and
    a module controlling the processor to replace the second call site with an inline control flow structure, the inline control flow structure redirecting execution flow to the inlined annotated function at the first call site, whereby a combination of the inlined annotated function at the first call site and the inline control flow structure is computationally equivalent to inlining the identified annotated function at the first call site and the second call site; wherein
    building a callgraph based on the annotated functions; and wherein
    identifying an annotated function two distinct call sites in the program listing is based on the callgraph.

10. The system of claim 9, wherein the program listing includes tiers of annotated functions.

11. The system of claim 10, the system further comprising a module controlling the processor to create inline control flow structures in the program listing in an order based on the tiers of annotated functions.

12. The system of claim 10, the system further comprising a module controlling the processor to create inline control flow structures in the program listing according to the tiers of annotated functions until the program listing meets a threshold.

13. The system of claim 9, the system further comprising a module controlling the processor to create inline control flow structures in the program listing for annotated functions called a greatest number of times until the program listing meets a threshold.

14. A non-transitory computer-readable storage medium storing instructions which, when executed by a computing device, cause the computing device to obfuscate a function, the instructions comprising:
    identifying in a program listing an annotated function having a first call site and a second call site;
    inlining the annotated function at an inline location in the program listing;
    replacing the first call site with a first inline control flow structure and the second call site with a second inline control flow structure, the first inline control flow structure and the second inline control flow structure redirecting execution flow to the inlined annotated function at the inline location, whereby a combination of the inlined annotated function at the inline location, the first inline control flow structure, and the second inline control flow structure is computationally equivalent to inlining the identified annotated function at the first call site and the second call site; and
    compiling a computer-executable file based on the program listing; wherein
    building a callgraph based on the annotated functions; and wherein
    identifying an annotated function two distinct call sites in the program listing is based on the callgraph.

15. The non-transitory computer-readable storage medium of claim 14, wherein the program listing includes tiers of annotated functions.

16. The non-transitory computer-readable storage medium of claim 15, the steps further comprising creating inline control flow structures in the program listing in an order based on the tiers of annotated functions.

17. The non-transitory computer-readable storage medium of claim 15, the steps further comprising creating inline control flow structures in the program listing according to the tiers of annotated functions until the program listing meets a threshold.

18. The non-transitory computer-readable storage medium of claim 17, the steps further comprising creating inline control flow structures in the program listing for annotated functions called a greatest number of times until the program listing meets a threshold.

19. The non-transitory computer-readable storage medium of claim 18, wherein the threshold is one of size, runtime performance, compile time, and complexity.

20. A non-transitory computer-readable storage medium storing instructions which, when executed by a computing device, cause the computing device to perform steps comprising:
- receiving a program listing including annotated functions for obfuscation;
- identifying in a program listing an annotated function having a first call site and a second call site
- inlining the annotated function at an inline location in the program listing;
- replacing the first call site with a first inline control flow structure and the second call site with a second inline control flow structure, the first inline control flow structure and the second inline control flow structure redirecting execution flow to the inlined annotated function at the inline location, whereby a combination of the inlined annotated function at the inline location, the first inline control flow structure, and the second inline control flow structure is computationally equivalent to inlining the identified annotated function at the first call site and the second call site, and
- compiling computer-executable instructions based on the program listing; wherein
- building a callgraph based on the annotated functions; and wherein
- identifying an annotated function two distinct call sites in the program listing is based on the callgraph.

21. The non-transitory computer-readable storage medium of claim 20, wherein the program listing includes tiers of annotated functions.

22. The non-transitory computer-readable storage medium of claim 21, the steps further comprising creating inline control flow structures in the program listing for a most important tier of annotations first.

23. The non-transitory computer-readable storage medium of claim 21, the steps further comprising creating inline control flow structures in the program listing for most important tiers of annotations first until the program listing meets a threshold.

24. The non-transitory computer-readable storage medium of claim 23, the steps further comprising creating inline control flow structures in the program listing for annotated functions called a greatest number of times until the program listing meets a threshold.

* * * * *